(12) United States Patent
Inukai

(10) Patent No.: US 10,302,422 B2
(45) Date of Patent: May 28, 2019

(54) MEASUREMENT SYSTEM, MEASUREMENT METHOD, ROBOT CONTROL METHOD, ROBOT, ROBOT SYSTEM, AND PICKING APPARATUS

(71) Applicant: Seiko Epson Corporation, Tokyo (JP)

(72) Inventor: Teruyuki Inukai, Matsumoto (JP)

(73) Assignee: Seiko Epson Corporation (JP)

( * ) Notice: Subject to any disclaimer, the term of this patent is extended or adjusted under 35 U.S.C. 154(b) by 231 days.

(21) Appl. No.: 15/379,975

(22) Filed: Dec. 15, 2016

(65) Prior Publication Data

US 2017/0176178 A1    Jun. 22, 2017

(30) Foreign Application Priority Data

Dec. 16, 2015 (JP) .................................. 2015-244927

(51) Int. Cl.
| | |
|---|---|
| *H04N 7/18* | (2006.01) |
| *H04N 9/47* | (2006.01) |
| *G01B 11/25* | (2006.01) |
| *B25J 9/16* | (2006.01) |
| *H04N 5/225* | (2006.01) |

(52) U.S. Cl.
CPC ......... *G01B 11/2513* (2013.01); *B25J 9/1612* (2013.01); *G01B 11/2527* (2013.01); *H04N 5/2256* (2013.01); *B25J 9/1697* (2013.01); *G05B 2219/40014* (2013.01)

(58) Field of Classification Search
None
See application file for complete search history.

(56) References Cited

U.S. PATENT DOCUMENTS

| | | | |
|---|---|---|---|
| 2005/0280831 A1 | 12/2005 | Fujiwara et al. | |
| 2010/0165301 A1* | 7/2010 | Kojima | G02B 27/48 |
| | | | 353/38 |
| 2014/0267702 A1* | 9/2014 | Profit | G01B 11/022 |
| | | | 348/136 |

FOREIGN PATENT DOCUMENTS

| | | |
|---|---|---|
| JP | 2006-003212 A | 1/2006 |
| JP | 2008-145209 A | 6/2008 |
| JP | 2008-190990 A | 8/2008 |
| JP | 2010-151842 A | 7/2010 |
| JP | 2010-175554 A | 8/2010 |
| JP | 2010-230523 A | 10/2010 |
| JP | 2014-025782 A | 2/2014 |

* cited by examiner

*Primary Examiner* — Talha M Nawaz
(74) *Attorney, Agent, or Firm* — Harness, Dickey & Pierce, P.L.C.

(57) ABSTRACT

A measurement system includes a projection section that switches first pattern light having a fringe pattern to second pattern light having a fringe pattern containing a greater number of fringes than the first pattern light and vice versa and projects the selected light on an object to be measured, an imaging section that has a plurality of pixels and images the first pattern light and the second pattern light projected on the object to be measured, a phase shift section that shifts the phase of the first pattern light and the second pattern light projected by the projection section on the object to be measured, and an analysis section that analyzes results of the imaging performed by the imaging section by relating the fringes contained in the first pattern light and the second pattern light to the plurality of pixels.

16 Claims, 7 Drawing Sheets

MEASUREMENT SYSTEM, MEASUREMENT METHOD, ROBOT CONTROL METHOD, ROBOT, ROBOT SYSTEM, AND PICKING APPARATUS

BACKGROUND

1. Technical Field

The present invention relates to a measurement system, a measurement method, a robot control method, a robot, a robot system, and a picking apparatus.

2. Related Art

A phase shift method using a projector and a camera has been known as a method for measuring the three-dimensional shape of an object in a noncontact manner (see JP-A-2006-3212, for example).

In the phase shift method, in general, the projector projects a fringe pattern formed of a sinusoidal wave expressed by the magnitude of the luminance value toward an object to be measured, and the camera images the projected fringe pattern. In this process, the fringe pattern is projected four times with the phase of the projected fringe pattern shifted by $\pi/2$ each time, and the camera images the fringe pattern whenever projected. The luminance values in the same coordinates in the four captured images obtained by the four imaging actions are characterized in that the absolute value of each of the luminance values may change due, for example, to the surface state and the color of the object to be measured in the coordinates, but the relative value of each of the luminance values changes exactly by the amount corresponding to the difference in the phase of the fringe pattern. The phase value of the fringe pattern in the coordinates can therefore be determined in such a way that ambient light, the surface state of the object under measurement, and other factors less affect the phase value.

The phase values are first each determined, in the captured images, as a value that falls within the range from $-\pi$ to $+\pi$ for each fringe of the fringe pattern instead of a continuous value. The thus determined phase values are so processed in phase unwrapping as to be continuous values in the captured images. For example, in the system described in JP-A-2006-3212, the phase unwrapping is performed by using Fourier transform.

In the system described in JP-A-2006-3212, since the phase unwrapping is performed by using Fourier transform, it undesirably takes a long period to analyze captured images.

SUMMARY

An advantage of some aspects of the invention is to provide a measurement system, a measurement method, and a robot control method capable of reduction in measurement period and further provide a robot, a robot system, and a picking apparatus including the measurement system.

The advantage can be achieved by the following aspects of the invention.

A measurement system according to an aspect of the invention includes a projection section that switches first pattern light having a fringe pattern to second pattern light having a fringe pattern containing a greater number of fringes than the first pattern light and vice versa and projects the selected light on an object to be measured, a phase shift section that shifts a phase of each of the first pattern light and the second pattern light, an imaging section that has a plurality of pixels and images each of the first pattern light and the second pattern light projected on the object to be measured, and an analysis section that analyzes results of the imaging performed by the imaging section by relating the fringes contained in the first pattern light and the fringes contained in the second pattern light to the plurality of pixels.

The measurement system described above allows phase unwrapping to be relatively readily performed with precision by relating the fringes contained in the first pattern light and the fringes contained in the second pattern light to the plurality of pixels. The analysis in the analysis section can therefore be performed more quickly. As a result, the measurement period can be shortened.

In the measurement system according to the aspect of the invention, it is preferable that the analysis section uses an expression $f=[\theta_1/2\pi \times C_2/C_1]$, where $C_1$ represents the number of fringes contained in the first pattern light, $C_2$ represents the number of fringes contained in the second pattern light, f represents the number of each of the fringes contained in the second pattern light (f is an integer greater than or equal to 1 but smaller than or equal to $C_2$), and $\theta_1$ represents a phase value of the first pattern light, to sequentially relate the number f of each of the fringes contained in the second pattern light to the plurality of pixels.

The fringes contained in the first pattern light and the fringes contained in the second pattern light can thus be relatively readily related to the plurality of pixels.

In the measurement system according to the aspect of the invention, it is preferable that a direction in which at least one of the first pattern light and the second pattern light is projected on the object to be measured intersects a direction in which the imaging section images the object to be measured at an angle greater than or equal to 20° but smaller than or equal to 40°.

Accurate measurement can thus be performed with a wide measurable range ensured.

In the measurement system according to the aspect of the invention, it is preferable that the number of fringes contained in the first pattern light is 1, and that the number of fringes contained in the second pattern light is greater than or equal to 2 but smaller than or equal to 50.

Information on the phase that continuously changes in the first pattern light can therefore be used to perform phase unwrapping that causes the phases of the fringes contained in the second pattern light to be values continuous with one another. When the number of fringes contained in the second pattern light is 50 or smaller, the number of fringes contained in the second pattern light can thus be excellently balanced with respect to the number of pixels of the projection section and the imaging section. As a result, accurate measurement can be performed.

In the measurement system according to the aspect of the invention, it is preferable that the projection section is a projector.

The thus configured projection section can switch the first pattern light and the second pattern light, which differ from each other in terms of the number of fringes, from one to the other and project the selected light on the object to be measured with precision.

In the measurement system according to the aspect of the invention, it is preferable that the projection section includes a laser light source.

A projection section capable of producing high-definition first pattern light and second pattern light can thus be achieved. As a result, the measurement accuracy can be improved.

A measurement method according to another aspect of the invention includes projecting first pattern light having a fringe pattern on an object to be measured at least four times with the first pattern light shifted by $\pi/2$ each time and using an imaging section having a plurality of pixels to image the first pattern light whenever the first pattern light is projected on the object to be measured, projecting second pattern light having a fringe pattern containing a greater number of fringes than the first pattern light on the object to be measured at least four times with the second pattern light shifted by $\pi/2$ each time and using the imaging section to image the second pattern light whenever the second pattern light is projected on the object to be measured, and analyzing results of the imaging performed by the imaging section by relating the fringes contained in the first pattern light and the fringes contained in the second pattern light to the plurality of pixels based on the results of the imaging performed by the imaging section.

The measurement method described above allows phase unwrapping to be relatively readily performed with precision by relating the fringes contained in the first pattern light and the fringes contained in the second pattern light to the plurality of pixels. The analysis can therefore be performed more quickly.

A robot controlling method according to another aspect of the invention includes projecting first pattern light having a fringe pattern on an object to be measured at least four times with the first pattern light shifted by $\pi/2$ each time and using an imaging section having a plurality of pixels to image the first pattern light whenever the first pattern light is projected on the object to be measured, projecting second pattern light having a fringe pattern containing a greater number of fringes than the first pattern light on the object to be measured at least four times with the second pattern light shifted by $\pi/2$ each time and using the imaging section to image the second pattern light whenever the second pattern light is projected on the object to be measured, and analyzing results of the imaging performed by the imaging section by relating the fringes contained in the first pattern light and the fringes contained in the second pattern light to the plurality of pixels based on the results of the imaging performed by the imaging section.

The robot control method described above can, for example, analyze an object to be measured at high speed to determine the coordinates over the surface of the object to be measured and measure the shape, size, posture, position, and other factors of the object to be measured on the basis of the coordinates. The results of the measurement can therefore be used to perform a variety of actions at high speed with precision.

A robot according to another aspect of the invention includes the measurement system according to the aspect of the invention.

The robot described above can, for example, analyze an object to be measured at high speed to determine the coordinates over the surface of the object to be measured and measure the shape, size, posture, position, and other factors of the object to be measured on the basis of the coordinates. The results of the measurement can therefore be used to perform a variety of actions at high speed with precision.

A robot system according to another aspect of the invention includes the measurement system according to the aspect of the invention.

The robot system described above can, for example, analyze an object to be measured at high speed to determine the coordinates over the surface of the object to be measured and measure the shape, size, posture, position, and other factors of the object to be measured on the basis of the coordinates. The results of the measurement can therefore be used to perform a variety of actions at high speed with precision.

A picking apparatus according to another aspect of the invention includes the measurement system according to the aspect of the invention.

The picking apparatus described above can, for example, analyze an object to be measured at high speed to determine the coordinates over the surface of the object to be measured and measure the shape, size, posture, position, and other factors of the object to be measured on the basis of the coordinates. The results of the measurement can therefore be used to perform a picking action at high speed with precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

A measurement system, a measurement method, a robot control method, a robot, a robot system, and a picking apparatus according to preferable embodiments of the invention will be described below with reference to the accompanying drawings.

Figure 1:
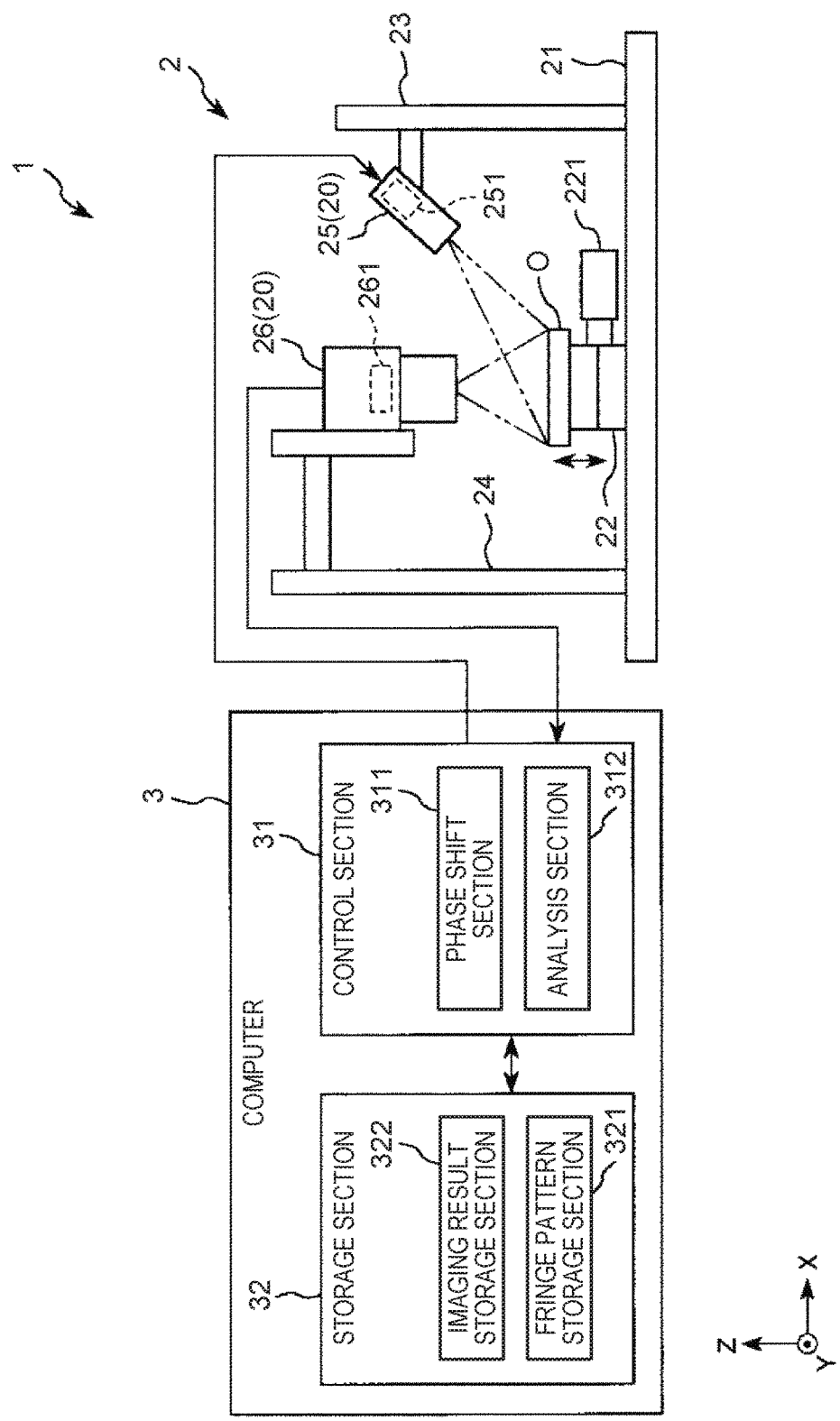
FIG. 1 shows a schematic configuration of a measurement system according to an embodiment of the invention.
Figure 2:
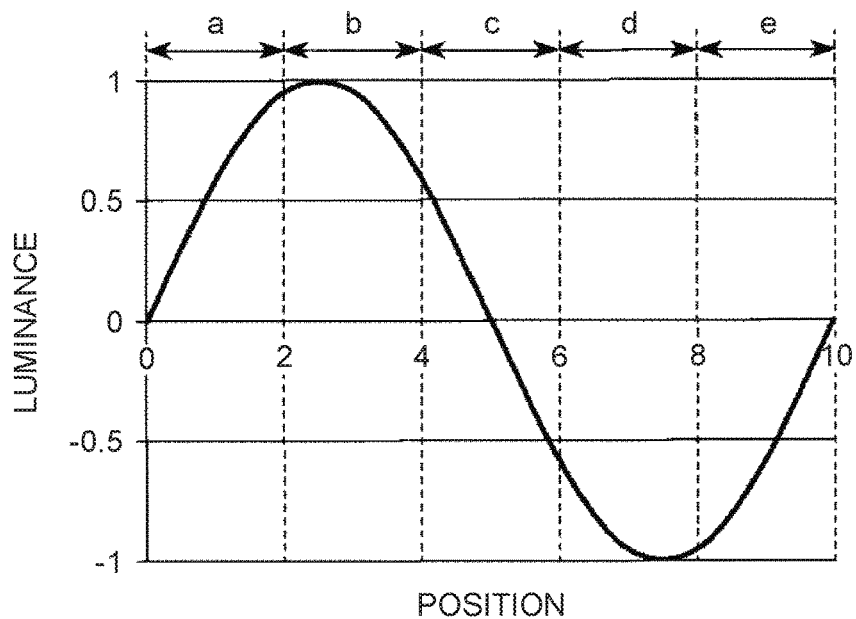
FIG. 2 is a graph showing the relationship between the position and the luminance of first pattern (one-cycle pattern) light from a projection section provided in the measurement system shown in FIG. 1.
Figure 3:
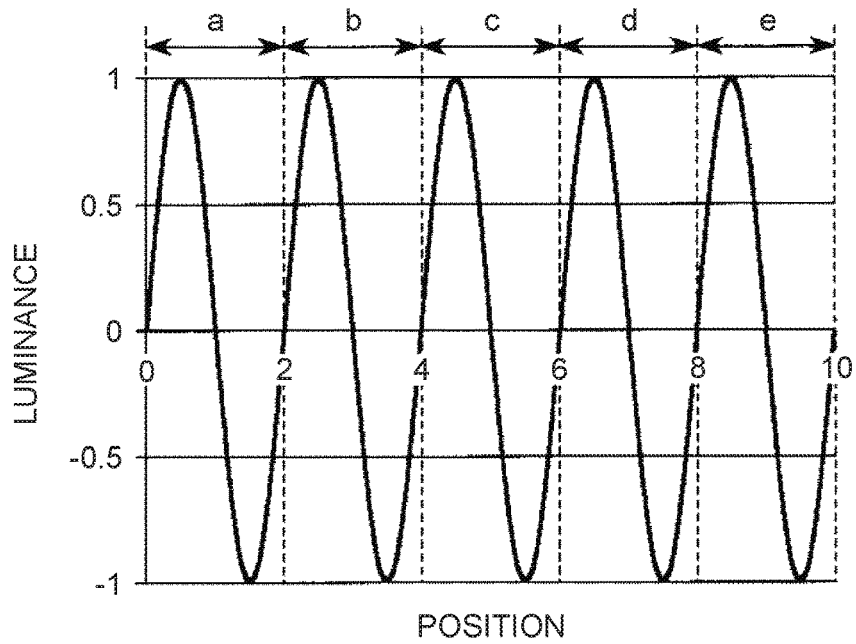
FIG. 3 is a graph showing the relationship between the position and the luminance of second pattern (n-division fringe pattern) light from the projection section provided in the measurement system shown in FIG. 1.
Figure 4:
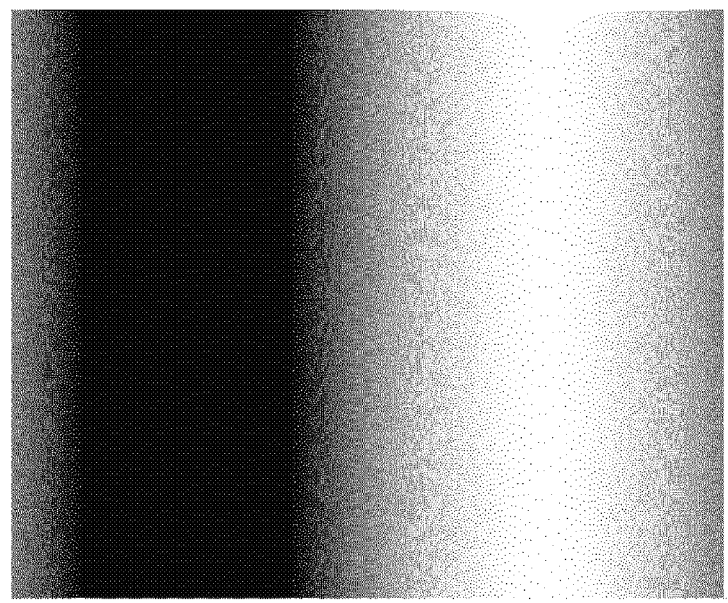
FIG. 4 shows the state of the brightness of the first pattern light shown in FIG. 2.
Figure 5:
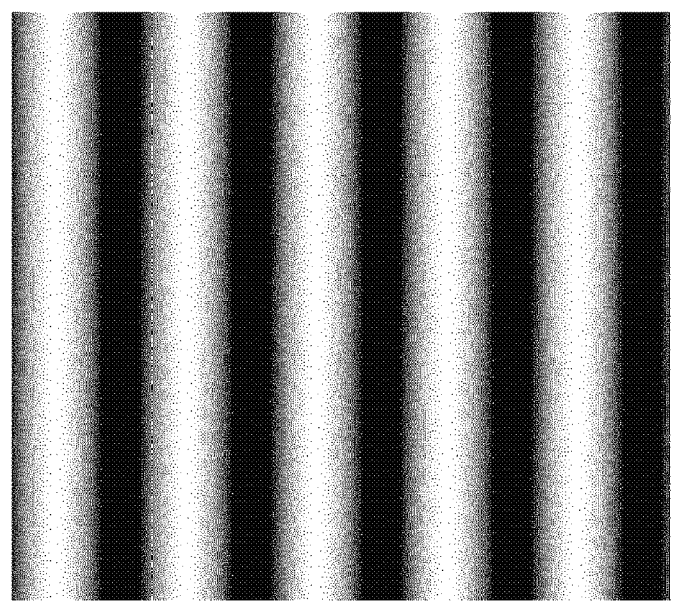
FIG. 5 shows the state of the brightness of the second pattern light shown in FIG. 3.

FIG. 1 shows a schematic configuration of a measurement system according to an embodiment of the invention. FIG. 2 is a graph showing the relationship between the position and the luminance of first pattern (one-cycle pattern) light from a projection section provided in the measurement system shown in FIG. 1. FIG. 3 is a graph showing the relationship between the position and the luminance of second pattern (n-division fringe pattern) light from the projection section provided in the measurement system shown in FIG. 1. FIG. 4 shows the state of the brightness of the first pattern light shown in FIG. 2. FIG. 5 shows the state of the brightness of the second pattern light shown in FIG. 3.

FIG. 1 shows an X axis, a Y axis, and a Z axis as three axes perpendicular to one another for ease of description. The direction parallel to the X axis is called an "X-axis direction." The direction parallel to the Y axis is called a "Y-axis direction." The direction parallel to the Z axis is called a "Z-axis direction." Further, the upper side in FIG. 1 is called "upper," and the lower side in FIG. 1 is called "lower."

A measurement system 1 shown in FIG. 1 is a system that measures the three-dimensional coordinates (that is, three-dimensional shape) of the surface of an object O to be measured by using the phase shift method. Instead, in a case where the shape of the object O to be measured is known, the measurement system 1 can measure the position, the posture, and other factors of the object O to be measured on the basis of the measured three-dimensional coordinates and information on the shape of the object O to be measured.

The measurement system 1 includes a measurement apparatus 2, which projects a measurement pattern and images the measurement pattern, and a computer 3, which controls the measurement apparatus 2.

Measurement Apparatus

The measurement apparatus 2 includes a base 21, a stage 22, support members 23 and 24, a projection section 25, and an imaging section 26.

The base 21 has a plate-like shape extending along the XY plane, which is the plane containing the X axis and the Y axis. On the upper surface of the base 21 are provided the stage 22, on which the object O to be measured is placed, the support member 23, which supports the projection section 25, and the support section 24, which supports the imaging section 26.

A placement surface on which the object O to be measured is placed is formed as part of the upper surface of the stage 22. The placement surface is a surface parallel to the XY plane, and a measurement range is set on the placement surface. The placement surface of the stage 22 may be provided, for example, with a suction-type chuck mechanism for fixing the object O to be measured. In the present embodiment, the stage 22 has a movement mechanism 221, which can move the position of the placed object O to be measured in the Z-axis direction.

The support members 23 and 24 are so provided as to stand on the base 21. The support member 23 supports the projection section 25 with respect to the base 21, and the support member 24 supports the imaging section 26 with respect to the base 21.

The projection section 25 includes a light source 251 and has the function of driving the light source 251 on the basis of image data to project video light on the measurement range on the stage 22. The video light is, for example, light carrying a fringe pattern formed of a sinusoidal wave expressed by the magnitude of the luminance value (see FIGS. 4 and 5). In particular, the projection section 25 has the function of switching first pattern light having a fringe pattern to second pattern light having a fringe pattern containing a greater number of fringes than those in the first pattern light and vice versa and projecting the selected pattern light on the object O to be measured.

The first pattern light is so configured that the luminance value thereof changes along a sinusoidal wave having one cycle corresponding to the measurement range (range from position 0 to position 10 in FIG. 2), as shown, for example, in FIG. 2. In the thus configured first pattern light, the luminance value continuously changes in such a way that a certain luminance value occurs only in one position in one direction along the measurement range, as shown in FIG. 4. Since the number of fringes contained in the first pattern light is one as described above, information on the phase that continuously changes in the first pattern light can be used to perform phase unwrapping that causes the phases of the fringes contained in the second pattern light to be values continuous with one another.

On the other hand, the second pattern light is so configured that the luminance value thereof changes along a sinusoidal wave having one cycle corresponding to each of areas obtained by dividing the measurement range by n (divided by 5 in FIG. 3), as shown in FIG. 3. In the thus configured second pattern light, the luminance value continuously and periodically changes in such a way that a certain luminance value occurs only in one position in one direction along the measurement range in each of the areas obtained by dividing the measurement range by n, as shown in FIG. 5.

The number of fringes contained in the second pattern light (number n by which measurement range is divided) is preferably greater than or equal to 2 but smaller than or equal to 50, more preferably greater than or equal to 5 but smaller than or equal to 50, still more preferably greater than or equal to 10 but smaller than or equal to 40. The number of fringes contained in the second pattern light can thus be excellently balanced with respect to the number of pixels of the projection section 25 and the imaging section 26. As a result, accurate measurement can be performed.

The projection section 25 is, for example, a liquid crystal projector, a laser projector, or any other projector. The thus configured projection section 25 can switch the first pattern light and the second pattern light, which differ from each other in terms of the number of fringes, from one to the other and project the selected light on the object O to be measured with precision.

For example, in the case where the projection section 25 is a liquid crystal projector, the projection section 25 includes a liquid crystal panel driven on the basis of image data and projects light from the light source 251 on the object O to be measured via the liquid crystal panel. In the case where the projection section 25 is a laser projector, the projection section 25 includes an optical sweeper, sweeps the light from the light source 251 with the optical sweeper while performing intensity modulation on the light on the basis of the image data, and projects the swept, intensity modulated light on the object O to be measured. In a case where the light source 251 is a laser light source that emits a linear laser beam extending in one of the vertical direction and the horizontal direction, the optical sweeper may sweep the laser beam from the light source 251 in the other one of the vertical direction and the horizontal direction. In a case where the light source 251 is a laser light source that emits a dot-shaped laser beam, the optical sweeper may sweep the laser beam from the light source 251 two-dimensionally in both the vertical direction and the horizontal direction. A lens may be disposed between the light source 251 and the object O to be measured. The lens can adjust the range over which the projection section 25 projects the light from the light source 251. As described above, when the light source 251 provided in the projection section 25 is a laser light source, a projection section 25 capable of producing high-definition first pattern light and second pattern light can be achieved. As a result, the measurement accuracy can be improved.

The number of pixels of the projection section 25 is determined in accordance with the size and shape of the object O to be measured, necessary measurement accuracy, and other factors and is not limited to a specific value. It is, however, preferable that the number of pixels is at least a million from the viewpoint of measurement accuracy.

The direction in which the video light exits from the projection section 25 inclines with respect to the direction of a normal to the placement surface of the stage 22. The configuration allows accurate measurement of the three-dimensional shape of the object O to be measured. The inclination angle is preferably greater than or equal to 20° but smaller than or equal to 40°, more preferably greater than or equal to 25° but smaller than or equal to 35°. The thus set inclination angle not only allows accurate measurement of the three-dimensional shape of the object O to be measured but also ensures a wide measurable range. If the inclination angle is too small, the measurement accuracy in the height direction decreases although the measurable range widens, whereas if the inclination angle is too large, the measurable range narrows although the measurement accuracy in the height direction increases.

The imaging section 26 includes an imaging device 261 having a plurality of pixels and has the function of imaging the measurement range on the stage 22 by using the imaging device 261. The imaging section 26 thus images the first pattern light and the second pattern light projected on the object O to be measured.

The number of pixels of the imaging section 26 is determined in accordance with the size and shape of the object O to be measured, necessary measurement accuracy, and other factors and is not limited to a specific value. It is, however, preferable that the number of pixels of the imaging section 26 is equal to or greater than the number of pixels of the projection section 25. Specifically, the number of pixels of the imaging section 26 is preferably greater than or equal to a million but smaller than or equal to ten millions, more preferably greater than or equal to one and a half millions but smaller than or equal to five millions. The burden on the computer 3 in the analysis of results of the imaging performed by the imaging section 26 can thus be reduced with high measurement accuracy maintained.

The direction in which the imaging section 26 performs the imaging is parallel to the direction of a normal to the placement surface of the stage 22. The configuration allows wide-range measurement of the three-dimensional shape of the object O to be measured. The direction in which the imaging section 26 images the object O to be measured intersects the direction in which at least one of the first pattern light and the second pattern light is projected on the object O to be measured preferably at an angle greater than or equal to 20° but smaller than or equal to 40°, more preferably at an angle greater than or equal to 25° but smaller than or equal to 35°. Accurate measurement can thus be performed with a wide measurable range ensured.

The imaging device 261 is not limited to a specific device and may, for example, be a CCD (charge coupled device) or a CMOS (complementary metal oxide semiconductor) device. The imaging device 261 converts a captured image into an electric signal on a pixel basis and outputs the electric signals.

The thus configured measurement apparatus 2 is controlled by the computer 3.

Computer

The computer 3 is electrically connected to the projection section 25 and the imaging section 26 of the measurement apparatus 2 described above, as shown in FIG. 1, and has the function of controlling the measurement apparatus 2 in accordance with a measurement program. The computer 3 includes a control section 31 and a storage section 32.

The control section 31 has the function of controlling operation of driving the projection section 25 and the imaging section 26 in accordance with a measurement program stored in the storage section 32. More specifically, the control section 31 has the function of controlling operation driving the projection section 25 on the basis of image data stored in the storage section 32. The projection section 25 can thus project video light based on the image data.

In particular, the control section 31 includes a phase shift section 311, which shifts the phase of each of the first pattern light and the second pattern light projected by the projection section 25 on the object O to be measured, and an analysis section 312, which analyzes results of the imaging performed by the imaging section 26 by relating the fringe contained in the first pattern light and the fringes contained in the second pattern light to the plurality of pixels of the imaging section 26.

The phase shift section 311 reads the image data stored in the storage section 32 as appropriate, performs image processing on the image data as required, and shifts the phase of each of the first pattern light and the second pattern light projected by the projection section 25 on the object O to be measured. The analysis section 312 analyzes results of the imaging performed by the imaging section 26 by relating the fringe contained in the first pattern light and the fringes contained in the second pattern light to the plurality of pixels of the imaging section 26. The analysis section 312 then determines, as a result of the analysis, for example, the shape, the size, and other factors of the object O to be measured. Actions and effects of the phase shift section 311 and the analysis section 312 will be described later in detail in conjunction with description of the action of the measurement system 1.

The storage section 32 stores the measurement program necessary for the control of the measurement apparatus 2 performed by the control section 31. In particular, the storage section 32 includes an imaging result storage section 322, which stores results of the imaging performed by the imaging section 26, and a fringe pattern storage section 321, which stores image data on the fringe patterns projected by the projection section 25.

The configuration of the measurement system 1 has been briefly described above. The thus configured measurement system 1 measures the three-dimensional shape of the object O to be measured as described below.

Figure 6:
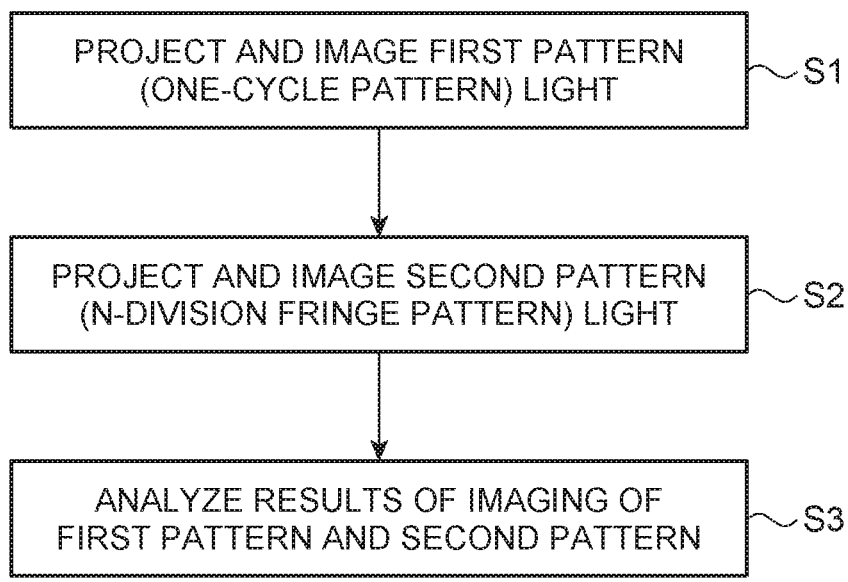
FIG. 6 is a flowchart for describing the action of (measurement method executed by) the measurement system shown in FIG. 1.
Figure 7:
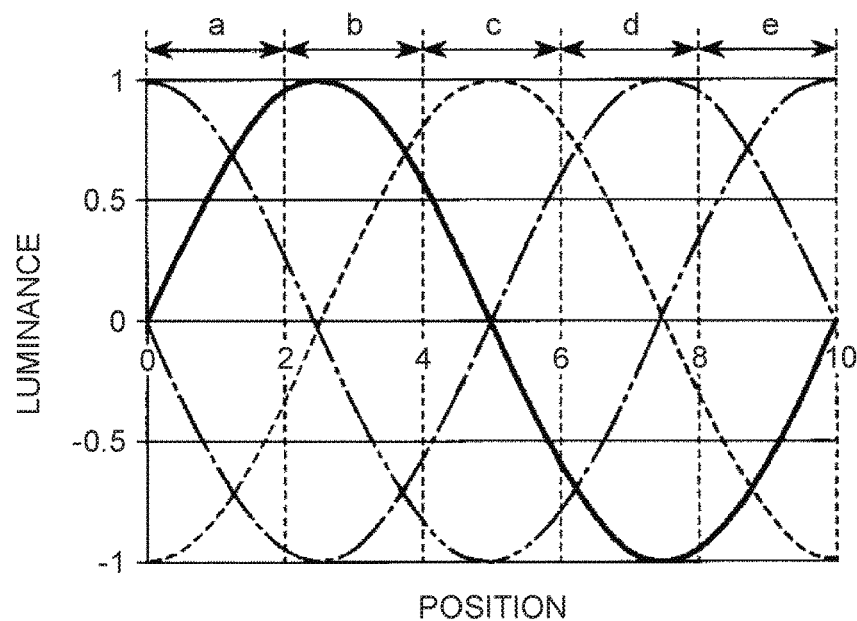
FIG. 7 is a graph showing the relationship between the position and the luminance of the first pattern light projected four times.
Figure 8:
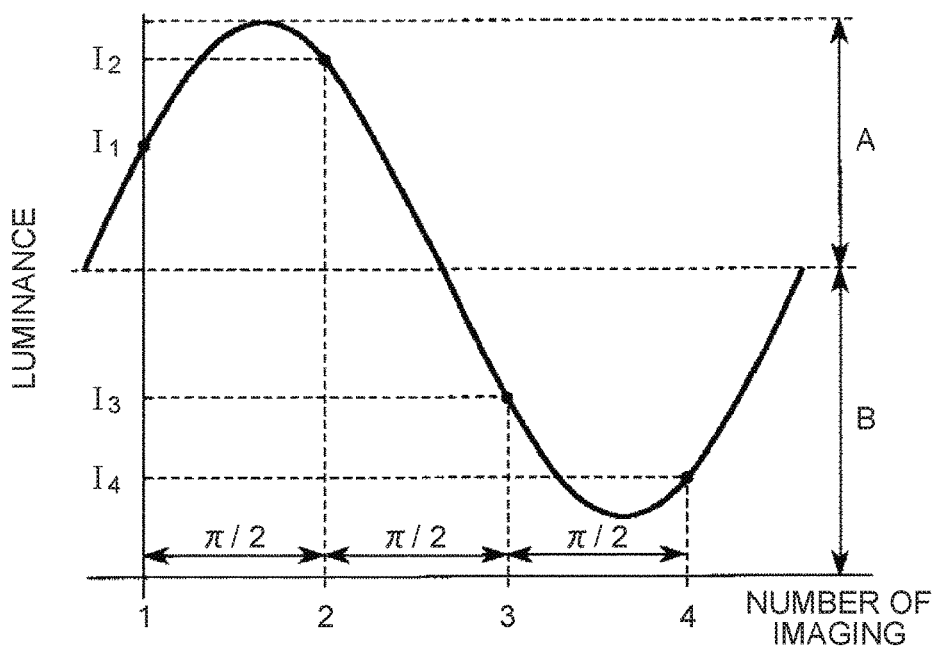
FIG. 8 is a graph showing the relationship between the luminance associated with a certain phase and the number of the imaging of the first pattern light.
Figure 9:
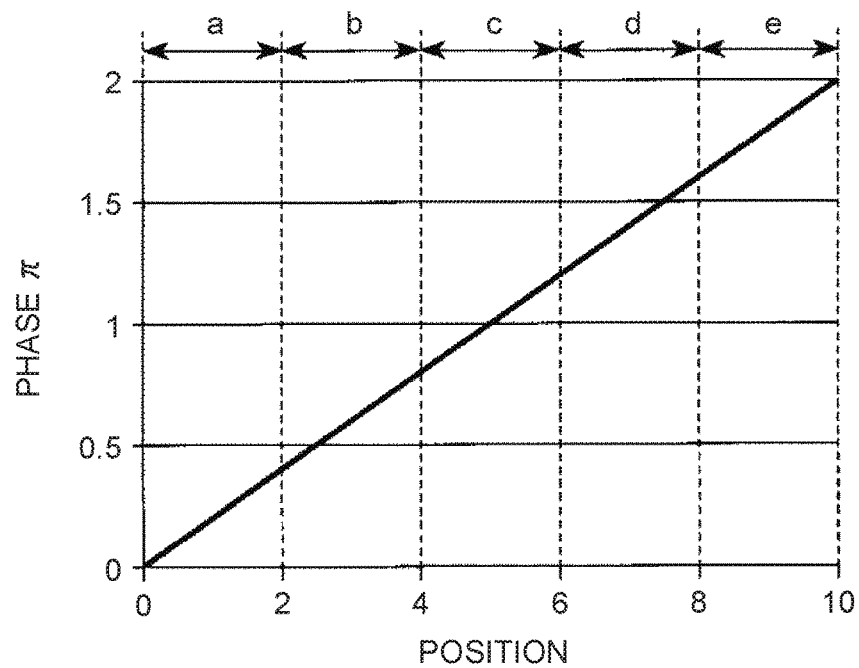
FIG. 9 is a graph showing the relationship between the position and the phase of the first pattern light.
Figure 10:
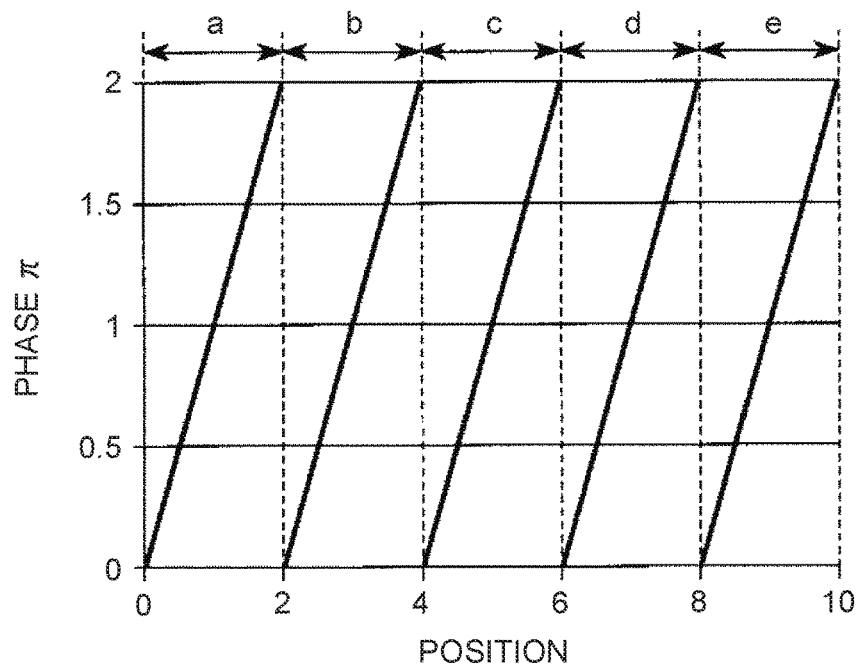
FIG. 10 is a graph showing the relationship between the position and the phase of the second pattern light.

FIG. 6 is a flowchart for describing the action of (measurement method executed by) the measurement system shown in FIG. 1. FIG. 7 is a graph showing the relationship between the position and the luminance of the first pattern light projected four times. FIG. 8 is a graph showing the relationship between the luminance associated with a certain phase and the number of the imaging of the first pattern light. FIG. 9 is a graph showing the relationship between the position and the phase of the first pattern light. FIG. 10 is a graph showing the relationship between the position and the phase of the second pattern light.

The measurement method using the measurement system 1 includes [1] a first projection/imaging step (step S1) of projecting the first pattern light on the object to be measured O and imaging the first pattern light projected on the object to be measured O, [2] a second projection/imaging step (step S2) of projecting the second pattern light on the object to be measured O and imaging the second pattern light projected on the object to be measured O, and [3] an analysis step (step S3) of analyzing results of the imaging steps, as shown in FIG. 6. The steps described above are carried out by the computer 3 that executes the measurement program stored in the storage section 32 described above. Each of the steps will be sequentially described below.

[1] First Projection/Imaging Step (Step S1)

The projection section 25 is first used to project the first pattern light described above on the object to be measured O four times with the phase of the first pattern light shifted by $\pi/2$ each time, and the imaging section 26 is used to image the first pattern light whenever projected on the object to be measured O.

For example, the first pattern light is projected on the object O to be measured in the first projection with the phase of the first pattern light shifted by $\pi/2$ so that the phase indicted by the solid line in FIG. 7 is achieved, in the second projection with the phase of the first pattern light shifted by another $\pi/2$ so that the phase indicted by the broken line in FIG. 7 is achieved, in the third projection with the phase of the first pattern light shifted by another $\pi/2$ so that the phase indicted by the chain line in FIG. 7 is achieved, and in the fourth projection with the phase of the first pattern light shifted by another $\pi/2$ so that the phase indicted by the two-dot chain line in FIG. 7 is achieved. The number of actions of projecting and imaging the first pattern light is not limited to 4 and may, for example, be 8, 16, or any multiple of 4.

[2] Second Projection/Imaging Step (Step S2)

The projection section 25 is then used to project the second pattern light described above on the object to be measured O at least four times with the phase of the second pattern light shifted by $\pi/2$ each time, and the imaging section 26 is used to image the second pattern light whenever projected on the object to be measured O.

[3] Analysis Step (Step S3)

The analysis section 312 then analyzes results of the imaging performed by the imaging section 26 by relating the fringes contained in the second pattern light to the plurality of pixels of the imaging section 26 on the basis of the results of the imaging performed by the imaging section 26.

In the analysis, first of all, a phase value $\theta$ at each pixel of each of the captured images is determined, that is, phase restoration is performed as follows.

In each of the first projection/imaging step [1] and the second projection/imaging step [2] described above, luminance values $I_1$, $I_2$, $I_3$, and $I_4$ at the same pixel in the four captured images obtained by the four imaging actions are characterized in that the absolute value of each of the luminance values may change due, for example, to the surface state and the color of the object to be measured at the pixel but the relative value of each of the luminance values changes exactly by the amount corresponding to the difference in the phase of the fringe pattern, as shown in FIG. 8.

The phase value $\theta$ at each pixel of each of the captured images can therefore be determined by Expression (1) described below. The phase value $\theta$ of the fringe pattern at each pixel of each of the captured images can therefore be determined in such a way that ambient light, the surface state of the object to be measured, and other factors less affect the phase value. In FIG. 8, reference character A denotes the maximum intensity (amplitude) of projected light, and reference character B denotes the amount of change in the luminance value due to ambient light.

$$\theta = \tan^{-1}\frac{I_3 - I_1}{I_4 - I_2} \quad (1)$$

Expression (1) is used to determine a phase value $\theta_1$ at each pixel of the four captured images (captured first pattern light) obtained in the first projection/imaging step [1] and a phase value $\theta_2$ at each pixel of the four captured images (captured second pattern light) obtained in the second projection/imaging step [2].

The phase values $\theta_1$ of the first pattern light and the phase values $\theta_2$ of the second pattern light are determined as described above.

The phase values $\theta_1$ are values continuous with one another in the captured images containing the captured first pattern light and ranges from $-\pi$ to $+\pi$, as shown in FIG. 9. In contrast, the phase values $\theta_2$ are not values continuous with one another in the captured images containing the captured second pattern light but ranges from $-\pi$ to $+\pi$ for each of the fringes of the fringe pattern, as shown in FIG. 10. The phase values $\theta_2$ for each of the fringes contained in the second pattern light allow the analysis section on the basis of the phase values $\theta_1$ to know which fringe of the second pattern light the phase values $\theta_2$ belong to. The phase values $\theta_1$ are therefore used to perform phase unwrapping in such a way that the phase values $\theta_2$ are converted into values continuous with one another (absolute phases) in the captured images.

In the phase unwrapping, the analysis section 312 first uses the expression $f=[\theta_1/2\pi \times C_2/C_1]$, where $C_1$ represents the number of fringes contained in the first pattern light, $C_2$ represents the number of fringes contained in the second pattern light, f represents the number of each of the fringes contained in the second pattern light (f is an integer greater than or equal to 1 but smaller than or equal to $C_2$), and $\theta_1$ represents the phase value of the first pattern light, to sequentially relate the number f of each of the fringes contained in the second pattern light to the plurality of pixels of the imaging section 26. The fringe contained in the first pattern light and the fringes contained in the second pattern light can thus be relatively readily related to the plurality of pixels.

For example, in a case where $C_1$ is 1 and $C_2$ is 5, the first fringe of the second pattern light is related to the range where the phase value of the first pattern light is greater than or equal to $0\pi$ but smaller than $0.4\pi$ (range labeled with a in FIG. 9), the second fringe of the second pattern light is related to the range where the phase value of the first pattern light is greater than or equal to $0.4\pi$ but smaller than $0.8\pi$ (range labeled with b in FIG. 9), the third fringe of the second pattern light is related to the range where the phase value of the first pattern light is greater than or equal to $0.8\pi$ but smaller than $1.2\pi$ (range labeled with c in FIG. 9), the fourth fringe of the second pattern light is related to the range where the phase value of the first pattern light is greater than or equal to $1.2\pi$ but smaller than $1.6\pi$ (range labeled with d in FIG. 9), and the fifth fringe of the second pattern light is related to the range where the phase value of the first pattern light is greater than or equal to $1.6\pi$ but smaller than $2\pi$ (range labeled with e in FIG. 9).

The number f of the fringe to which each pixel of each of the captured images of the second pattern light belongs is determined as described above. Expression (2) described below is then used to determine an absolute phase $\theta_3$ at each pixel of each of the captured images of the second pattern light.

$$\theta_3 = \theta_2 + 2\pi \times f \quad (2)$$

The absolute phases $\theta_3$, which are values converted from the phase values $\theta_2$ and continuous with one another in the captured images, are determined as described above for phase unwrapping.

The thus determined absolute phase $\theta_3$ at each pixel is multiplied by a calibration value to produce height information. Information on the three-dimensional shape of the object to be measured O (information on coordinates over surface of object to be measured O) can thus be obtained.

The measurement method described above allows phase unwrapping to be relatively readily performed with precision by relating the fringe contained in the first pattern light and the fringes contained in the second pattern light to the plurality of pixels. The analysis can therefore be performed more quickly.

Robot (Picking Apparatus)

An example of a robot, a robot system, and a picking apparatus according to an embodiment of the invention will next be described.

Figure 11:
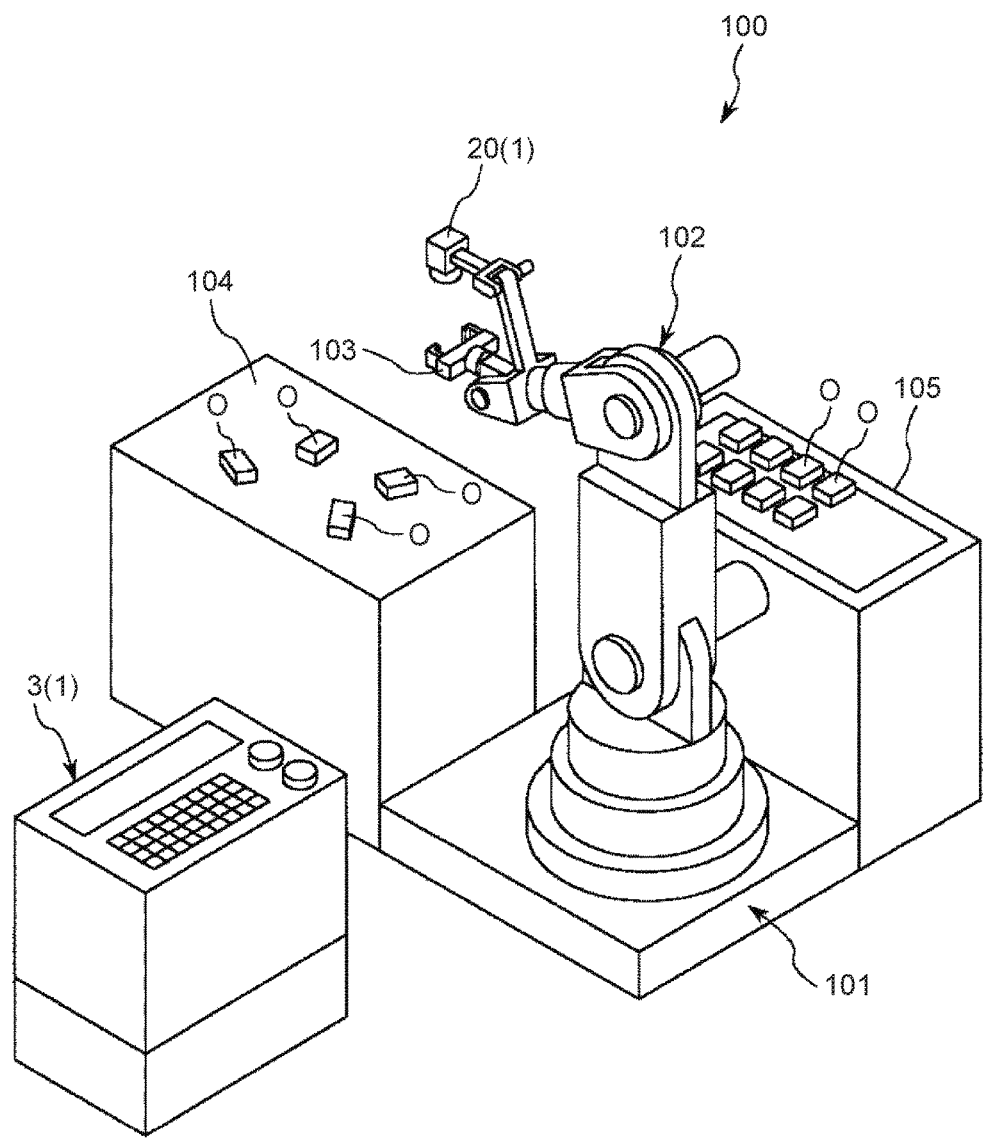
FIG. 11 is a perspective view showing an example of a robot (picking apparatus) according to an embodiment of the invention.

FIG. 11 is a perspective view showing an example of a robot (picking apparatus) according to the embodiment of the invention.

A robot 100 shown in FIG. 11 is a picking apparatus that includes a base 101, a robot arm 102, which is provided on the base 101, a hand 103 and an imaging unit 20, which are provided at a front end portion of the robot arm 102, and the computer 3 and causes the hand 103 to grip workpieces (objects to be measured O) placed on a workpiece supply apparatus 104 and causes the robot arm 102 to so operate as to transport the workpieces onto a workpiece accommodation apparatus 105. The imaging unit 20 includes the projection section 25 and the imaging section 26 described above, and the robot 100 includes the measurement system 1.

The robot 100 is so configured that when the workpieces (objects to be measured O) on the workpiece supply apparatus 104 are transported onto the workpiece accommodation apparatus 105, the measurement system 1 measures the position and posture of each of the workpieces (objects to be measured O) placed in an misaligned manner on the workpiece supply apparatus 104, and the robot arm 102 and the hand 103 are so operated on the basis of a result of the measurement that the hand 103 properly grips the workpieces and places the workpieces in desired positions and postures in an aligned manner on the workpiece accommodation apparatus 105.

The robot 100 described above can, for example, analyze an object to be measured O at high speed to determine the coordinates over the surface of the object to be measured O and measure the shape, size, posture, position, and other factors of the object to be measured O on the basis of the coordinates. The results of the measurement can therefore be used to perform a variety of actions (picking action, for example) at high speed with precision.

In FIG. 11, the location at which the imaging unit 20 is installed is not limited to the front end portion of the robot arm 102 and may, for example, be a portion of the robot arm 102 other than the front end portion thereof, or the imaging unit 20 may be provided at a location other than the robot arm 102 (ceiling or wall, for example).

In FIG. 11, a robot and the measurement system 1 may be combined with each other to form a robot system 100.

The measurement system, the measurement method, the robot control method, the robot, the robot system, and the picking apparatus according to the embodiment of the invention have been described above with reference to the drawings, but the invention is not limited to the embodiment. For example, in the invention, the configuration of each portion described in the embodiment can be replaced with an arbitrary configuration having the same function, and another arbitrary configuration can be added to the embodiment.

The entire disclosure of Japanese Patent Application No. 2015-244927, filed Dec. 16, 2015 is expressly incorporated by reference herein.

What is claimed is:

1. A measurement system comprising:
a projection section that switches first pattern light having a fringe pattern to second pattern light having a fringe pattern containing a greater number of fringes than the first pattern light and vice versa and projects a selected one of the first pattern light and the second pattern light on an object to be measured;
a phase shift section that shifts a phase of the first pattern light and the second pattern light;
an imaging section that has a plurality of pixels and images the first pattern light and the second pattern light projected on the object to be measured; and
an analysis section that analyzes results of the imaging performed by the imaging section by relating the fringes contained in the first pattern light and the fringes contained in the second pattern light to the plurality of pixels by (i) determining a phase value at each pixel in the fringes contained in the first pattern light and the fringes contained in the second pattern light based on a change in luminance values and (ii) measures characteristics of the object using the determined phase values,
wherein the measurement system is configured to measure a shape of the object based on the analysis of the results,
wherein the number of fringes contained in the first pattern light is 1, and
wherein the number of fringes contained in the second pattern light is greater than or equal to 2 but smaller than or equal to 50.

2. The measurement system according to claim 1, wherein the analysis section uses an expression $f=[\theta_1/2\pi \times C_2/C_1]$, where $C_1$ represents the number of fringes contained in the first pattern light, $C_2$ represents the number of fringes contained in the second pattern light, f represents the number of the fringes contained in the second pattern light (f is an integer greater than or equal to 1 but smaller than or equal to $C_2$), and $\theta_1$ represents a phase value of the first pattern light, to sequentially relate the number f of the fringes contained in the second pattern light to the plurality of pixels.

3. The measurement system according to claim 1,
wherein a direction in which at least one of the first pattern light and the second pattern light is projected on the object to be measured intersects a direction in which the imaging section images the object to be measured at an angle greater than or equal to 20° but smaller than or equal to 40°.

4. The measurement system according to claim 1,
wherein the projection section is a projector.

5. The measurement system according to claim 1,
wherein the projection section includes a laser light source.

6. A measurement method comprising:
projecting first pattern light having a fringe pattern on an object to be measured at least four times with the first pattern light shifted by π/2 each time and using an imaging section having a plurality of pixels to image the first pattern light whenever the first pattern light is projected on the object to be measured;

projecting second pattern light having a fringe pattern containing a greater number of fringes than the first pattern light on the object to be measured at least four times with the second pattern light shifted by π/2 each time and using the imaging section to image the second pattern light whenever the second pattern light is projected on the object to be measured; and analyzing results of the imaging performed by the imaging section by relating the fringes contained in the first pattern light and the fringes contained in the second pattern light to the plurality of pixels based on the results of the imaging performed by the imaging section by (i) determining a phase value at each pixel in the fringes contained in the first pattern light and the fringes contained in the second pattern light based on a change in luminance values and (ii) measures characteristics of the object using the determined phase values, wherein the number of fringes contained in the first pattern light is 1, and the number of fringes contained in the second pattern light is greater than or equal to 2 but smaller than or equal to 50.

7. A robot controlling method comprising:

projecting first pattern light having a fringe pattern on an object to be measured at least four times with the first pattern light shifted by π/2 each time and using an imaging section having a plurality of pixels to image the first pattern light whenever the first pattern light is projected on the object to be measured;

projecting second pattern light having a fringe pattern containing a greater number of fringes than the first pattern light on the object to be measured at least four times with the second pattern light shifted by π/2 each time and using the imaging section to image the second pattern light whenever the second pattern light is projected on the object to be measured; and analyzing results of the imaging performed by the imaging section by relating the fringes contained in the first pattern light and the fringes contained in the second pattern light to the plurality of pixels based on the results of the imaging performed by the imaging section by (i) determining a phase value at each pixel in the fringes contained in the first pattern light and the fringes contained in the second pattern light based on a change in luminance values and (ii) measures characteristics of the object using the determined phase values, wherein the number of fringes contained in the first pattern light is 1, and the number of fringes contained in the second pattern light is greater than or equal to 2 but smaller than or equal to 50.

8. A robot comprising the measurement system according to claim 1.

9. A robot comprising the measurement system according to claim 2.

10. A robot comprising the measurement system according to claim 3.

11. A robot system comprising the measurement system according to claim 1.

12. A robot system comprising the measurement system according to claim 2.

13. A robot system comprising the measurement system according to claim 3.

14. A picking apparatus comprising the measurement system according to claim 1.

15. A picking apparatus comprising the measurement system according to claim 2.

16. A picking apparatus comprising the measurement system according to claim 3.

* * * * *